US006918985B2

(12) United States Patent
Geyer

(10) Patent No.: US 6,918,985 B2
(45) Date of Patent: Jul. 19, 2005

(54) METHOD FOR MAKING A RADOME

(75) Inventor: Robert Buxton Geyer, Tacoma, WA (US)

(73) Assignee: The Boeing Company, Chicago, IL (US)

( * ) Notice: Subject to any disclaimer, the term of this patent is extended or adjusted under 35 U.S.C. 154(b) by 129 days.

(21) Appl. No.: 10/317,528

(22) Filed: Dec. 12, 2002

(65) Prior Publication Data

US 2004/0113305 A1 Jun. 17, 2004

(51) Int. Cl.[7] .................. B32B 31/14; B32B 31/26; B29C 45/14
(52) U.S. Cl. .................. 156/285; 156/92; 156/245; 156/286; 264/46.4; 264/257; 264/258; 264/510; 264/544; 264/553; 264/571
(58) Field of Search .................. 156/92, 245, 285, 156/286; 264/46.4, 46.7, 510, 544, 553, 571, 258, 257

(56) References Cited

U.S. PATENT DOCUMENTS

| RE25,417 E | * | 7/1963 | Amason .................. 244/1 A |
| 4,237,514 A | * | 12/1980 | Cline .................. 361/117 |
| 4,796,153 A | * | 1/1989 | Amason et al. .................. 361/218 |
| 4,902,215 A | | 2/1990 | Seemann, III |
| 5,052,906 A | | 10/1991 | Seemann |
| 5,323,170 A | | 6/1994 | Lang |
| 5,344,685 A | * | 9/1994 | Cassell .................. 428/64.1 |
| 5,403,537 A | * | 4/1995 | Seal et al. .................. 264/511 |
| 5,662,293 A | | 9/1997 | Hower et al. |
| 5,841,066 A | * | 11/1998 | Bocherens .................. 174/2 |
| 5,849,234 A | * | 12/1998 | Harrison et al. .................. 264/257 |
| 5,958,325 A | | 9/1999 | Seemann, III et al. |
| 6,107,976 A | * | 8/2000 | Purinton .................. 343/872 |
| 6,203,749 B1 | * | 3/2001 | Loving .................. 264/510 |
| 6,555,045 B2 | * | 4/2003 | McClure et al. .................. 264/510 |
| 2002/0022422 A1 | * | 2/2002 | Waldrop et al. .................. 442/179 |
| 2005/0041362 A1 | * | 2/2005 | Hall .................. 361/225 |

FOREIGN PATENT DOCUMENTS

| EP | 0 557 612 | * | 9/1993 |
| EP | 0 843 379 | * | 5/1998 |
| GB | 944955 | | 12/1963 |
| GB | 2 132 027 | * | 6/1984 |
| JP | 60-83826 | * | 5/1985 |
| JP | 7-1673 | * | 1/1995 |
| JP | 2002-299937 | * | 10/2002 |

* cited by examiner

Primary Examiner—Melvin Mayes
(74) Attorney, Agent, or Firm—Alston & Bird LLP

(57) ABSTRACT

A method for making a radome includes the steps of placing a first dry fiber preform into a female mold having a mold surface contoured as a negative image of a desired contour to be imparted to an exterior surface of the radome, and placing a polyetherimide foam core in the mold on top of the first dry fiber preform, the foam core having first been thermally formed to generally match the contour of the mold surface prior to being placed in the mold. Next, a second dry fiber preform is placed on top of the foam core so as to form a sandwich structure having the foam core sandwiched between the dry fiber preforms, and the dry fiber preforms are vacuum infused with a fluid heat-curable resin to impregnate the preforms with the resin. The sandwich structure is then heated to cure the resin.

13 Claims, 3 Drawing Sheets

METHOD FOR MAKING A RADOME

FIELD OF THE INVENTION

The present invention relates to radomes and, more particularly, to a method for making a foam-core radome.

BACKGROUND OF THE INVENTION

Radomes are structures used on aircraft for covering instruments such as radar devices that transmit and receive electromagnetic radiation to protect such devices from the elements. A radome is constructed to be substantially transparent to the electromagnetic radiation. Conventionally, radomes have been constructed with a honeycomb core covered on its opposite sides by facesheets of fiber-matrix composite material. A drawback of such construction is that under some circumstances water can penetrate the facesheet, such as through a fastener hole or through a defect in the facesheet, and collect inside the honeycomb core. The water trapped in the honeycomb core can then cause further damage through various mechanisms including expansion caused by freezing. Additionally, the water absorbs the electromagnetic radiation, thereby degrading the signal quality and reducing effectiveness of the radar device. Epoxy bond lines also can be degraded by prolonged exposure to the water, which can cause delamination and even failure of the radome. Furthermore, when water collects in the honeycomb core it adds significantly to the weight of the radome, which is particularly undesirable in an aircraft installation.

Foam-core radomes have been developed at least in part as a response to problems such as those mentioned above. Foam is advantageous as a core material in that foam has a reduced tendency to harbor water compared with honeycomb. However, foams that have been used in prior foam-core radomes have less rigidity than the types of honeycomb materials that have traditionally been used. Conventional foam-core radomes are made from polyurethane foam and were popular in the 1950's. But polyurethane foam has a tendency to crumble as well as having poor fatigue and impact properties, and improved foam-core radomes have been largely ignored. Another problem with foam-core radomes is that they require an expensive and time-consuming fabrication process involving an autoclave process.

One method of making a foam-core radome is disclosed by U.S. Pat. No. 5,323,170. The radome includes a closed-cell foam core sold under the trademark Divinycell™ and is surrounded by layers of fiber-reinforced plastic or so-called "prepreg." The prepreg layers are synthetic fibers that are impregnated with resin and then stored in a cool environment until applied about the core. The completed mold is then cured either in an autoclave or by a difficult multiple-step vacuum and heating process.

Thus, there is a need to provide an improved method for making a foam-core radome that solves the inefficiencies and cost opportunities of the prior art. In particular, there is a need to avoid the time consuming and messy application of prepreg layers, as well as avoiding costly and time-consuming autoclave procedures.

SUMMARY OF THE INVENTION

The present invention addresses the above needs by providing a method for making a radome having a foam core, yielding a radome having improved properties relative to prior foam-core radomes. The method also is relatively simple and inexpensive compared to an autoclave process. To these ends, a method in accordance with one preferred embodiment of the invention includes the steps of placing a first dry fiber preform into a female mold having a mold surface contoured as a negative image of a desired contour to be imparted to an exterior surface of the radome, and placing a closed-cell foam core, such as a polyetherimide foam core, in the mold on top of the first dry fiber preform, the foam core having first been formed to generally match the contour of the mold surface prior to being placed in the mold. Next, a second dry fiber preform is placed on top of the foam core so as to form a sandwich structure having the foam core sandwiched between the dry fiber preforms, and the dry fiber preforms are vacuum infused with a fluid heat-curable resin to impregnate the preforms with the resin. The sandwich structure is then heated to cure the resin.

In accordance with a more particular method embodiment of the invention, the vacuum infusing step employs a resin distribution device on at least one side of the sandwich structure, the resin distribution device being operable to distribute the fluid resin with a substantially uniform coverage over the dry fiber preform adjacent the resin distribution device. Generally, the vacuum infusing step comprises attaching a flexible impervious sheet to the mold so as to enclose the sandwich structure and the resin distribution device in a space defined between the mold and the impervious sheet, evacuating the space through an outlet that opens into the space, and supplying the fluid resin into the space through a resin inlet that opens into the space such that the resin flows into the resin distribution device.

In some cases, the foam core is penetrated by a plurality of openings through the thickness of the foam core prior to performing the vacuum infusion step. Such openings can be provided for purposes of fastener attachments. However, the openings can also facilitate flow of resin to the opposite side of the sandwich structure from the side having the resin distribution device.

In one embodiment, the foam core is placed in the mold as a one-piece structure. Alternatively, the foam core is placed in the mold as a plurality of abutting foam pieces.

In another embodiment of the invention, the vacuum infusion step further comprises introducing the fluid resin into the space between the impervious sheet and the mold through a second resin distribution device comprising a plurality of channels formed in the mold surface for distributing the fluid resin generally uniformly over the first dry fiber preform. Accordingly, both sides of the sandwich structure have resin distributed over their surfaces by resin distribution systems.

Advantageously, the methods according to the present invention combine a unique closed-cell foam and a low-cost resin infusion method to make a low-cost radome having improved structural and performance characteristics.

BRIEF DESCRIPTION OF THE DRAWINGS

The above and other objects, features, and advantages of the invention will become more apparent from the following description of certain preferred embodiments thereof, when taken in conjunction with the accompanying drawings in which.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
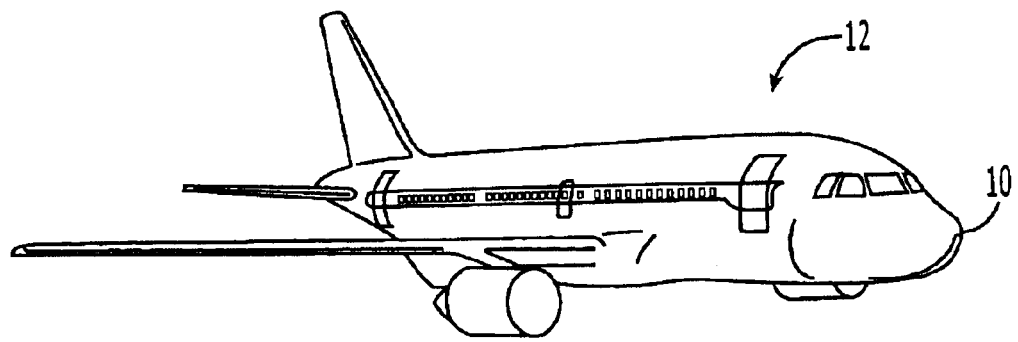
FIG. 1 is a perspective view of a radome according to the present invention in use with an aircraft.

FIG. 1 illustrates a preferred application of the present invention. As shown, a radome 10 according to one embodiment of the present invention is shown in conjunction with an aircraft 12 as a nose radome suitable for housing radar, electromagnetic, or other electronic equipment. The radome 10 could also be located in other locations on the aircraft 12, and could also be used in a variety of air-, land-, and sea-based vehicles. The shape of the radome 10 can also vary, although the shapes described herein are preferred embodiments.

Figure 2:
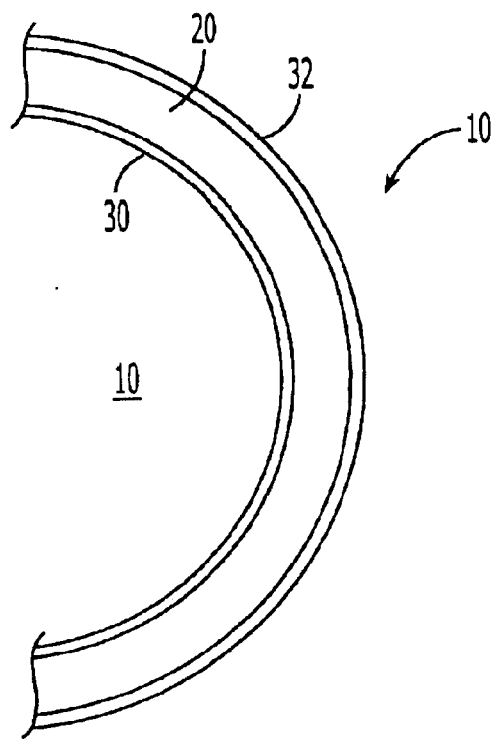
FIG. 2 is a partial cross-sectional view of a radome according to one embodiment of the present invention.

FIG. 2 illustrates a cross-sectional view of the radome 10 according to one embodiment of the present invention. In particular, the radome 10 comprises a foam core 20, an inner facesheet 30, and an outer facesheet 32 that collectively form a cavity 16 for housing and protecting the electrical, radar, or other components located therein. The core 20 is a closed-cell foam that is shaped in the general form of the radome 10 before the process of combining the core with the facesheets. More specifically, the core 20 is a rigid, heat-formed polyetherimide (PEI) foam that provides excellent static strength and stiffness-to-weight ratio, impact strength, and radar transparency characteristics. The closed-cell nature of the foam prevents the core 20 from retaining moisture even in the event that the core is compromised. In addition, the closed-cell structure provides more surface area for contacting the facesheets 30, 32 during the formation of the radome 10, which reduces or eliminates any void content between the core 20 and the facesheets. The foam core 20 is also resistant to the infusion of adhesives, resins, and other liquids used during the formation of the radome 10, as discussed below. However, in one embodiment the core 20 defines a plurality of channels 22 therethrough to assist with the transfer or resin or suitable bonding agent from one side of the core to the other.

The facesheets 30, 32 are formed of a woven, dry fiberglass that is preferably of aerospace quality. As is known in the art, aerospace quality fiberglass differs from commercial grade fiberglass, such as fiberglass used in boat hulls and the like, in that aerospace quality fiberglass meets higher standards of mechanical properties, thickness, and cleanliness, and is tested to those standards. These standard specifications are common procedure in the aerospace industry, and records of tests performed on the material is generally required to be stored and available for inspection.

The term "dry" as used herein is meant to mean that the fiberglass is not preimpregnated or pre-coated with an adhesive or resin. The dry preforms therefore are not what are known in the art as "prepregs," which are formed of fiber-reinforced resin. The resin-based prepregs have several disadvantages. In particular, prepregs require personal protective gloves, expensive freezers for storage, and have relatively short (6 month) shelf lives. The latter is especially problematic, as the prepregs must be tracked over their lifespan, and prepregs that expired without being used must be replaced. By contrast, the dry preforms of the present invention are used in conjunction with resins that cure at room temperature and are applied during the manufacture of the radome 10, as discussed below. More specifically, the preforms of the present invention can range in thickness depending on the design requirements of the radome 10, but generally fall between 0.020–0.090 inch on each side of the core 20. An edge band (not shown), which provides a base where fasteners connect the radome to the fuselage of the aircraft, can be much thicker, such as about 0.2–0.4 inch, with no foam between the layers of fiberglass. In addition, each preform facesheet accounts for the total thickness desired for that facesheet, which is not the case for hand layup and prepreg plies mentioned above.

Figure 3:
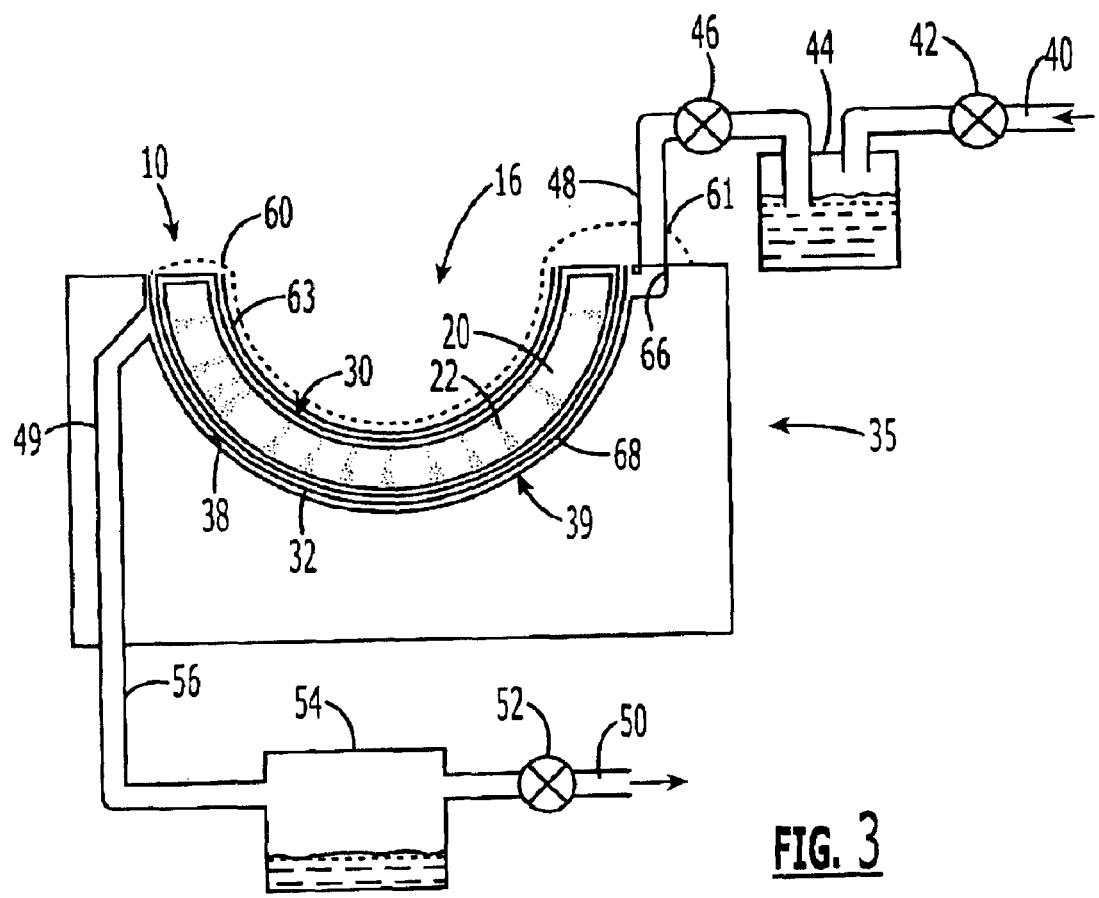
FIG. 3 is a cross-sectional view of a complete mold in accordance with one embodiment of the present invention.

FIG. 3 illustrates a mold or layup tool 36 for forming the radome 10. In particular, the tool 36 includes a mold or layup surface 38 that is shaped in the negative image of a desired contour to be imparted to an exterior surface of the radome 10. As shown, the layup surface 38 is a female configuration defining a cavity 39, although male configurations are possible. The tool 36 is formed from a metal shell, such as aluminum or steel, that is sufficiently supported to give a good contour that does not warp. Other materials may also be used. For example, some fiberglass/epoxy tools have been made from a wooden model. While this type of tooling has a lower cost initially, the tool tends to develop air leaks within a short time under normal work conditions. The tool 36 is connected to a resin infusion system having a resin inlet 48 that provides a source of resin or other suitable bonding agent via a series of valves 42, 46 and a resin reservoir 44. According to one embodiment, the resin is a 2-part epoxy resin having a low enough viscosity for resin infusing. Advantageously, no other bonding materials are necessary, such as additional film adhesives and the like that are required for traditional prepreg layup/autoclave cure systems. A pressure source 40, such as a source of compressed air, is in selective fluid communication with the resin inlet 48 via the valves 42, 46. The tool 36 also includes a resin outlet 49 opening into the cavity 16 that is connected to an outlet tube 56. The outlet tube 56 is in fluid communication with a resin trap 54. A vacuum line 50 is also in communication with the resin trap 54 via a valve 52. In this regard, it is possible to use the vacuum line 50 with out without the pressure source 40. A flexible, impervious sheet, such as an airtight vacuum bag 60, extends across the cavity 39 defined by the layup surface 38 such that the bag is drawn against the inner facesheet 30 of the radome 10 when vacuum is applied through an opening 61 connecting the vacuum bag with the resin inlet. According to one embodiment, a resin distribution device 63 is positioned between the vacuum bag 60 and the inner facesheet 30, and in another embodiment, a second resin distribution device 68 is positioned between the outer facesheet 32 and the layup surface 38. As discussed below, the resin distribution devices 63, 68 may be in the form as the resin distribution mediums described in U.S. Pat. No. 4,902,215 entitled "Plastic Transfer Molding Techniques For The Production Of Fiber Reinforced Plastic Structures," which is incorporated herein by reference in its entirety. The resin distribution devices 63, 68 can many other forms and features, such as commercially available plastic netting or screen material of sufficient thickness and pitch, but regardless of the form the devices act to distribute resin along the facesheets 30, 32 such that the facesheets become impregnated with resin. In this regard, it is possible that the facesheets 30, 32 themselves act as resin distribution devices such that no further devices are needed to uniformly impregnate the facesheets with resin.

Figure 4:
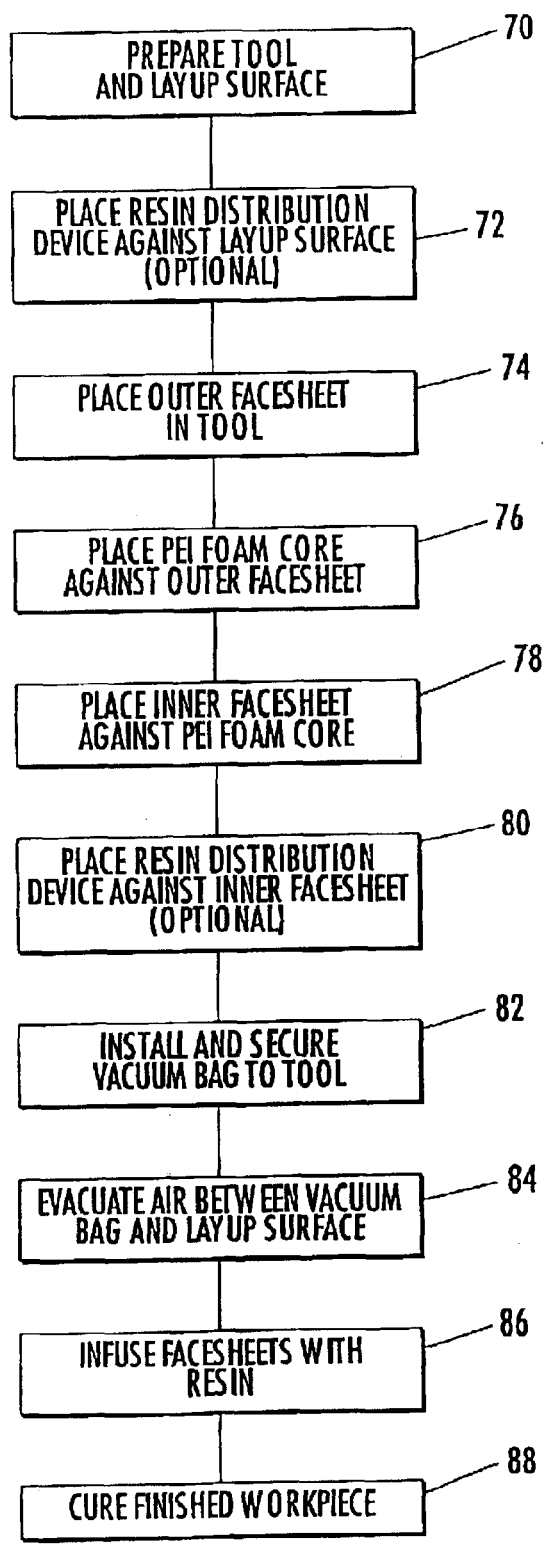
FIG. 4 is a process diagram showing the steps of forming a radome according to one embodiment of the present invention.

As described by FIG. 4, the process of forming a radome according to one embodiment of the present invention comprises the step 70 of preparing the tool 36 by coating the layup surface 38 with a release agent, such as Frekote 700 of Loctite Industries (formerly Dexter-Hysol), and the step 74 of placing the outer facesheet 32 against the layup surface. The heat-formed PEI foam core 20 having a form that is generally matched to the contour of the layup surface 38 is then placed via step 76 on the outer facesheet 32, followed by step 78 of placing the inner facesheet 30 over the core. It should be noted that the PEI foam core 20 can be a single piece of foam when placed in the tool 36, although the core can be placed in the tool as a plurality of abutting foam pieces that collectively form the shape of the radome 10. In addition, the step 76 of placing the PEI foam core against the outer facesheet may also include embedding a lightning diversion rail into the core, such that the rail is in place prior to the vacuum infusion step, as discussed below. Alternatively, a pressure-sensitive, adhesively-bonded series of metal "buttons" can be applied to the painted outside surface of the radome for attaching a lightning diversion rail.

In one embodiment, the facesheets 30, 32 completely encapsulate the core 20 to form a sandwich structure having the foam core 20 sandwiched between the dry fiber preforms or facesheets 30, 32. As discussed above, the ends of the radome 10 can be ramped or tapered to a solid laminate (no foam) for improving strength of attachment. The method continues with step 82 of fitting the vacuum bag 60 over the layup surface 38 and attaching the bag to the tool 36. The vacuum bag 60 can be coated with a release agent on the side facing the inner facesheet 30, or a film (not shown) such as polyvinyl acetate or other suitable material may be applied to the inner facesheet 30 before covering it with the vacuum bag.

After the vacuum bag 60 is secured to the tool 36 in an airtight fashion, step 84 includes removing the air from the radome materials by opening the valve 52 in the vacuum line 50 while the valve 46 in the resin inlet 48 remains closed. The air between the vacuum bag 60 and the layup surface 38 is substantially evacuated. Heat can also be applied in order to evaporate any moisture present between the layers of the radome 10.

A liquid resin is prepared and stored in the resin reservoir 44, which includes mixing the components of a 2-part epoxy (if used). According to step 86, the valves 46 and 42 are opened while the valve 52 of vacuum line 50 is still open, which directs resin that is preferably at room-temperature from the reservoir 44 through the resin inlet 48 and into the space defined by the vacuum bag 60 and layers forming the radome 10. The resin is vacuum infused through the facesheets 30, 32 such that the facesheets are saturated with resin and no voids or dry spots exist that could lead to unsecured areas between the facesheets and the core 20. To assist with directing the resin to both facesheets 30, 32, the core 20 may include a plurality of channels 22 that allow resin to pass through the core and flow between the facesheets. The channels 22 may also be used as fastener attachments after the radome 10 has been cured.

When the facesheets 30, 32 have been fully impregnated with resin, which may be indicated by resin flowing into the resin trap 54, the resin supply is discontinued by closing valves 46 and 42. According to step 88, the radome 10 is then allowed to cure, such as by heating the radome at 250° F. for 2 hours. The heating temperature and time are dictated by the particular application and the manufacturer's recommendations depending on the epoxy. However, temperatures typically range from room temperature to 350° F., and cure times range from about 2 hours to about 24 hours. The vacuum applied by the vacuum line 50 is preferably maintained during the curing step. After the curing step, the vacuum bag 60 is removed, the radome 10 is trimmed to eliminate any waste or surface blemishes, and the desired finish is applied using standard methods. Hardware can also be applied using standard methods.

An alternative method for forming the radome can be used that uses some of the teachings of the '215. As mentioned above, the '215 patent employs a complex resin distribution device that assists in the distribution of resin through a workpiece. However, the '215 patent does not address methods of forming a radome or using PEI form cores specifically. The differences in the teachings of the '215 patent and the present invention are significant, as the exact method of resin distribution is tertiary to the fact of combining the high performance foam with the fiberglass preform skins or facesheets to make a low-cost, water-curable radome.

Another alternative method includes distributing resin to both sides of the radome 10 by directing the resin through a resin distribution system having a second resin distribution device that directs resin to the outer facesheet 32. The second resin distribution device may be in the form of a passageway 66 that is positioned near the opening 61 connecting the vacuum bag 60 with the resin inlet 48. Alternatively, the second resin distribution device may be in the form of the resin distribution device 68, which may be in the form of the "resin distribution medium" as disclosed by the '215 patent mentioned above. As such, one or both sides of the sandwich structure formed by the core 20 and the facesheets 30, 32 may be adjacent corresponding resin distribution devices 63, 68 (or 66) in order to facilitate infusing the facesheets uniformly with resin.

Advantageously, the methods of the present invention specifically utilize a PEI foam core 20, which provides unexpected and particularly beneficial advantages, such as low construction costs, light weight, excellent structural integrity and impact resistance, and fast throughput. In particular, the methods of the present invention utilize dry facesheets 30, 32 instead of prepregs, and resins that cure at temperatures lower and less costly than autoclave temperatures. While some aspects of radome production are known, the specific combination and advantages realized by the methods of the present invention provide a true advancement in the art of forming radomes.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for making a radome, comprising:
    placing a first dry fiber preform into a female mold having a mold surface contoured as a negative image of a desired contour to be imparted to an exterior surface of the radome;

placing a foam core in the mold adjacent the first dry fiber preform, the foam core having first been thermally formed to generally match the contour of the mold surface prior to being placed in the mold, the foam core also being penetrated by a plurality of openings through the thickness of the foam core;

placing a second dry fiber preform adjacent the foam core so as to form a sandwich structure having the foam core sandwiched between the dry fiber preforms;

vacuum infusing the dry fiber preforms with a fluid heat-curable resin to impregnate the preforms with the resin;

heating the sandwich structure to cure the resin; and extending fasteners through the openings defined by the foam core.

2. A method according to claim 1, wherein the vacuum infusing step employs a resin distribution device on at least one side of the sandwich structure, the resin distribution device being operable to distribute the fluid resin with a substantially uniform coverage over the dry fiber preform adjacent the resin distribution device.

3. A method according to claim 2, wherein the vacuum infusing step comprises attaching a flexible impervious sheet to the mold so as to enclose the sandwich structure and the resin distribution device in a space defined between the mold and the impervious sheet, evacuating the space through an outlet that opens into the space, and supplying the fluid resin into the space through a resin inlet that opens into the space such that the resin flows into the resin distribution device.

4. A method according to claim 3, wherein the foam core is placed in the mold as a one-piece structure.

5. A method according to claim 3, wherein the foam core is placed in the mold as a plurality of abutting foam pieces.

6. A method according to claim 3, wherein the vacuum infusion step further comprises introducing the fluid resin into the space through a second resin distribution device comprising a plurality of channels formed in the mold surface for distributing the fluid resin generally uniformly over the first dry fiber preform.

7. A method for making a radome comprising:

placing a first dry fiber preform into a female mold having a mold surface contoured as a negative image of a desired contour to be imparted to an exterior surface of the radome;

placing a foam core in the mold adjacent the first dry fiber preform, the foam core having first been thermally formed to generally match the contour of the mold surface prior to being placed in the mold;

placing a second dry fiber preform adjacent the foam core so as to form a sandwich structure having the foam core sandwiched between the dry fiber preforms;

embedding a lightning diversion rail into the foam core;

vacuum infusing the dry fiber preforms with a fluid heat-curable resin to impregnate the preforms with the resin; and heating the sandwich structure to cure the resin.

8. A method for making a radome, comprising:

placing a first dry fiber perform into a female mold having a mold surface contoured as a negative image of a desired contour to be imparted to an exterior surface of the radome;

placing a closed-cell foam core in the mold on top of the first dry fiber perform, the foam core having first been thermally formed to generally match the contour of the mold surface prior to being placed in the mold, the foam core being substantially resistant to liquid infusion;

placing a second dry fiber perform on top of the foam core so as to form a sandwich structure having the foam core sandwiched between the dry fiber performs and an edge band about at least a portion of a periphery of the foam core in which the first and second dry fiber performs are adjacent one another without the foam core therebetween;

embedding a lightning diversion rail into the foam core;

vacuum infusing the dry fiber performs with a fluid heat-curable resin to impregnate the performs with the resin; and heating the sandwich structure to cure the resin.

9. A method according to claim 8, wherein the vacuum infusing step comprises attaching a flexible impervious sheet to the mold so as to enclose the sandwich structure in a space defined between the mold and the impervious sheet, evacuating the space through an outlet that opens into the space, and supplying the fluid resin into the space through a resin inlet that opens into the space.

10. A method according to claim 9, wherein the foam core is penetrated by a plurality of openings through the thickness of the foam core prior to performing the vacuum infusion step.

11. A method according to claim 9, wherein the foam core is placed in the mold as a one-piece structure.

12. A method according to claim 9, wherein the foam core is placed in the mold as a plurality of abutting foam pieces.

13. A method according to claim 9, wherein the vacuum infusion step further comprises introducing the fluid resin into the space through a resin distribution device comprising a plurality of channels formed in the mold surface for distributing the fluid resin generally uniformly over the first dry fiber perform.

* * * * *